106-85

United States Patent Office 3,279,934
Patented Oct. 18, 1966

1

2

3,279,934
JOINT FILLING COMPOSITION

Harry R. Schuppner, Jr., El Cajon, Calif., assignor to Kelco Company, San Diego, Calif., a corporation of Delaware No Drawing. Filed Dec. 23, 1963, Ser. No. 332,903
10 Claims. (Cl. 106—85)

This application is a continuation-in-part of copending application Serial No. 158,640, filed December 5, 1961, entitled Joint Filling Composition, and now abandoned. This invention relates to cementing compositions and more especially to improved aqueous finishing cements of the type including an inorganic mineral filler and additives for improving adhesion and "workability."

In the art of rendering smoothly finished surfaces, especially the surfaces of interior structures such as walls, ceilings, and the like, workers are regularly confronted with the problems of filling a cavity, of cementing units together or both. To meet these problems workers customarily turn to what may be called "finishing cements," especially in the construction and finishing of wallboard type surfaces. Such "finishing cements" may be understood to generally include a finely ground mineral filler such as limestone or the like, an aqueous vehicle in which the filler is to be suspended for easy applicability and, often, a suitable binding agent compatible with the aqueous vehicle, such as a glue or the like. The plasticity of the cement thus derived makes it apt for filling depressions in a surface; for example, for filling-in cracks and wall joints, for hiding nail holes, for repairing minor cracks in cementitious or plaster walls and like purposes. Such finishing cements are sometimes known as spackling compounds, joint compounds, topping cements, crack-fillers, plastic cements, wall joint fillers, and the like. Such finish-filler compositions are also used as surface-texturing materials such as in a wall-paint to render a stippled or roughened texture which both decorates a surface and hides minor blemishes, especially on wallboard, concrete, or plaster type walls.

Illustrative of the problems associated with these compositions are joint-compounds for use with wallboard (i.e., plaster-integrant panels, used in dry-wall construction) for interior wall and ceiling surfaces. These joint-compounds are a filler material which is adapted to fill the joints between panels and thereby cement them together in place as well as to fill cavities or cracks in and between the panels, and to imbed reinforcing paper tape along the joints between the panels. This tape is often cemented in combination with metal (outside) corners and must bond securely with them. A finer and smoother joint compound is often used whereby to provide a smooth cementitious covering or topping over such surfaces as rough-cemented joints (as a base), and nail-holes or other cavities in plaster panels. Such a use of a plastic joint-compound is more completely described in U.S. Patent 2,456,269 to Gill. Products of this type are generally made by preparing a dry mixture of a suitable mineral filler, including limestone, silica, clay, pyrophyllite, slate, asbestine, mica, and the like, naturally all ground to a considerable fineness, generally below 200 mesh, with a suitable binding agent compatible with water. For use, the so described mixture is worked up with sufficient water to yield a trowelable consistency. It is then applied to the wall joints or hairline cracks to be filled, most generally with a trowel, or, where the same mixture is used as a surface coating, it is applied to the surface by such known means as a paint roller or even by blowing with a device of the cement gun type. The water is allowed to evaporate whereupon the binding agent included in the formulation sets the applied material to a hard rocklike mass.

While it may at first appear simple, it is not easy to formulate a filler of the type described which fulfills the necessary functions ideally. One of the greatest difficulties encountered is shrinkage upon drying, which naturally defeats the purpose of a joint filler in the first place, namely, to form an unbroken contour in the treated surface. Another problem commonly encountered is the lack of suitable thixotropic and workability properties, which, when ideally present, will permit easy application, by troweling or otherwise, and with instantaneous cling and "set-up" as soon as the trowel is removed.

In the use of a plastic finishing cement, it is commonly a vexing problem to apply the wet cement properly to a substrate. If the cement is sprayed on (e.g., with a cement gun) the flow-resistance of the highly viscous cement under pressure quite often is a problem. A composition which will not flow easily and evenly through the pressurized lines is obviously unsatisfactory for spray-on applications. On the other hand, filling compositions are commonly applied with a trowel, or other bladed tool, and for this, must exhibit good cling (i.e., not flow or run when deposited upon a surface) as well as ready workability under the action of a trowel, for instance. Prior art cements having the desired cling are not satisfactorily workable and too viscous for good spray-on usage. The invention has provided these contrary features, however.

For example, finishing cements are commonly carried by a worker on a flat dispenser plate known as a masoner's "hawk," having a handle underneath whereby the worker may balance a quantity of cement on the plate as he moves about applying portions to a wall or other treated surface with a trowel or broad knife. For instance, such a worker might be filling nail-holes or touching up a plasterboard wall. Workers in the art recognize that when a supply of the cement material is placed upon the hawk to be carried thereon and worked therefrom, it must "set-up" and hold together, lest it run and drip from the hawk. The cement must cling together well even when a worker is picking his way tipsily up a ladder or across a staging. The inventive composition provided by the addition of a Xanthomonas colloid according to the invention provides this internal cling to a cement.

Cling properties are also critical for aqueous cements as they are applied to a substrate. Good substrate-cling is necessary to provide control of the cement, keep it in place and prevent creep or sag, for instance, when wet cement is slapped against a smooth vertical wall. This substrate cling requires not only that the cement should adhere to a wall surface, but that it should "set-up" so that a glob of the material laid on a surface does not flow-out onto surrounding areas but maintains its conformation, substantially as applied. Without such control of cement morphology, applying it is a messy proposition, as workers in the art today know since they must regularly contend with poor cling. Aqueous finishing cements such as joint compounds for wallboard panels are sometimes seen oozing down vertical walls, dripping upon newly-laid floors, furniture, etc., and staining them badly. Poor cling also makes it difficult for a worker to manipulate wet cement after he has applied it to a surface, i.e., to spread it out evenly to exactly the place and depth he desires. The invention renders this substrate-cling where the prior art cannot.

Poor substrate-cling becomes even more critical when applying wet cement to an overhead surface, such as to a ceiling. It is difficult enough for a worker to balance himself and his loaded hawk while shuffling along a staging or up a ladder as he reaches out, directing all of his attention to filling a nail-hole or mending a crack; but the job becomes impossible if, in addition, the cement won't "behave" when he manipulates it. Yet it is a great deal to ask of a cement that it "set-up" quickly and cling well, to any overhead surface for a time while a worker applies it, spreads it out, smooths it, and generally "works it."

For instance, in the art of finish-cementing upon a wallboard ceiling, it is customary, as noted in the aforementioned Patent 2,456,269, to cover and reinforce the joints between adjacent wallboard panels by imbedding a perforated tape therebetween with a joint cement. To do this a worker must first arrange a staging running along under the joints so that he can reach them to apply his cement; then, picking up his hawk with one hand and piling a supply of wet cement on it, he must climb up upon the staging and, reaching upward, spread the cement evenly along the joint while he shuffles precariously along the staging. As can be imagined, such a performance comes dangerously close to walking a tightrope blindfolded. Hence, one can understand the consternation of the performer when his material won't "set up" upon the joint surfaces as he slaps it up there, but instead drips, oozes, and slides in all directions down upon him, upon the staging, and upon the floor. Of course, poor cling will also give a worker the added problem of juggling an oozy supply of material upon the smooth surface of his hawk. Hence, it will be appreciated that in the art workers depend heavily upon good "cling" in a cement which is still not overly viscous and "workable" with a trowel.

This needed cling must persist for a time also, since workers must customarily lay the cement along a crack in one continuous run and then, returning, smooth it out and feather it at the edges. For a long crack this can involve at least a minute or so during which the cement shall stay in place, even on an inverted (e.g., ceiling) surface.

The necessary cling must also hold true, even when a very thin coating of cement is rendered, as for example, where a cemented crack seam is "feathered" or tapered at its edges to merge imperceptibly with the surrounding surface. It is obvious that only a cement having good workability as well as good cling can be so feathered and render a coating that is both smooth flowing and highly adherent. This combination of good cling with good trowelability, while extremely important to workers in the art is not easy to satisfy. The present invention has taken a giant step toward giving a filling composition this exacting cling requirement along with the necessary workability characteristics.

Present-day joint compositions do not provide these characteristics adequately. Many workers refuse to use wallboard and the attendant joint compositions in home construction because of the mess caused by dripping cement. Where it is used on walls and ceilings in new homes, such dry wall construction has heretofore required costly delays in installing "finish materials," such as hardwood floors, finished plumbing, wood trim, or the like which would be stained and marred by dropped gobs of the typically caustic joint composition. Applications, despite all care, commonly cast such droppings about as they "finish" wallboard walls and ceilings. The dropped material is quite disagreeable as it may be highly corrosive to many surfaces such as fine woods or painted metals, discoloring them, etc., and is difficult to remove once it has hardened, as it quickly does. Furthermore, the "drippiness" and poor cling of present day joint compositions make them very unsatisfactory for use in minor repair jobs within a furnished dwelling where any dropped material will likely damage. This is especially so when applied by the novice or "home-handyman." Hence, the present invention in improving cling markedly contributes toward making such compositions acceptable in a wide variety of uses and makes them practicable for a wider market such as the "do it yourself" market which is burgeoning today.

In all of these applications for finishing cement, it will be apparent to those skilled in the art that a versatile and widely useful cement must meet other demanding requirements. Such finishing cements must offer: ready solubility in aqueous suspensions at all temperatures; homogeneous suspension of heavy mineral material; easy workability and applicability, being easily laid down with a spray gun or a blade; excellent "cling" to a working substrate, especially if a smooth metal surface such as a nailhead is involved; spreadability or "trowel-ability" under the action of a trowel blade whereby the cement will "feather-out" smoothly to merge with the substrate; hardening to a smooth, hard surface; good adherence to such diverse substrates as fibrous (e.g., paper or wood) ceramic (e.g., plaster or cement) plastic and metal (such as a nailhead of a steel corner); relative quick-drying; "easily-sanded" to a fine-grained finished surface which can be painted and which will merge into a smooth adjacent substrate giving a monolithic effect so as not to "show" through a paint cover; resistance to chemical reactions which might discolor the finished surface, such as with applied paints or with atmospheric vapors, as from a gas stove; edge and crack resistance; having good stability in its suspending powers and its viscosity despite extremes of temperature, despite diverse chemical additives and after long-aging; and other like characteristics apparent to those skilled in the art. Therefore, when one attempts to modify and improve such a plastic filling composition with an additive to improve its workability and cling, his improved composition must also satisfy these stringent requirements. Adding a Xanthomonas hydrophilic colloid according to the present invention has surprisingly rendered such a composition.

Hence, it is an object of this invention to provide an improved additive for aqueous finishing cements and a method for preparing them whereby improved applicability is realized.

Another object is to provide cements having both improved workability and cling.

Another object of the invention is to provide a stable cement mixture having satisfactory suspension, temperature and chemical stability which is much superior in applicability.

Yet another object is to provide a cement mixture, and a method for preparing the same, having superior workability for trowel or spray-on uses and having improved stability under a broad range of changing temperatures and pH, as well as having better suspension-stability during extended storage.

Still another object is to provide a stable cement mixture having superior cling.

Still another object is to provide a stable cement mixture which is easier to spray or trowel-on.

An object of the present invention is to provide a wall joint cement which is highly thixotropic, resistant to shrinkage upon drying, and capable of forming a hard rock-like mass upon drying.

Another object of the invention is to provide a wall joint filler which can be readily emplaced and is yet free of any tendency to sag, creep or flow subsequent to initial positioning, especially on vertical walls.

Other objects of the invention will appear as the description thereof proceeds.

Generally speaking, and in accordance with an illustrative embodiment of my invention, I incorporate powdered mineral, for example limestone ground to pass 200 mesh, with a water-compatible adhesive such as soya protein, casein, and the like, with a modicum of the hydrophilic colloid elaborated by the bacterium *Xanthomonas campestris,* and with sufficient water to form a trowelable mass.

In accordance with our invention, we have found that the foregoing objectives may be achieved by incorporating a relatively small amount of a Xanthomonas hydrophilic colloid material into conventional aqueous cement mixes. Suitable amounts of such Xanthomonas material in cements comprising simple aqueous solutions have been found to be generally in the range of from about 0.1 to about 5.0 percent by weight of the said solution. A preferred range is from about 0.6 to about 1.2 percent by weight of the solution. In cements comprising an aqueous solution including inert fillers, this range is modified to from about 0.05% to about 1.5% by weight of the solution; the range of from about 0.5% to about 1.0% being preferred.

For example, I may take from 50 to 95% of a suitable powdered mineral filler, to which is admixed from 0.1 to 1.0% *Xanthomonas campestris* hydrophilic colloid, and the balance a water-compatible adhesive of the type in the range of 1% to 8% desired. Preferably all of these ingredients are dry and comminuted, so that they may be blended to give a uniform, apparently homogeneous powder. Sufficient water is added with stirring to give the proper consistency for use. It will be understood that the amount of water will vary, depending upon the type of mineral filler used, the type of water-compatible adhesive used, and their relative proportions. In most cases, however, for each 100 parts of dry mix, somewhere between 40 and 60 parts of water, by weight, will be found to be suitable.

By proceeding in accordance with the invention, remarkable properties are obtained in the mixture as prepared for application, in that a light but adequate body is formed which suffices to hold the mixture in place, wherever it is put, even on vertical surfaces, and even in considerable thickness. At the same time, the mix is "slippery" to the trowel, lacking adherence to the trowel and coming away clean so that a smooth surface can be troweled without any pits. As is well known, even to amateur and occasional workers in the field, if ordinary plaster is mixed with water so that it achieves sufficient plasticity to stay where put, then it tends to "grab" the surface even of a smooth trowel, and it is very difficult to trowel to a uniform smooth surface.

The above is one of the preferred examples of my inventive cement additive, namely, a *Xanthomonas campestris* hydrophilic colloid. This material is a polymer containing mannose, glucose, potassium gluconate and acetyl radicals. In such a Xanthomonas colloid, the potassium portion can be replaced by several other cations without substantial change in the property of the material for the instant purposes. This material, which is a high molecular weight, exocellular material, may be prepared from the bacterium *Xanthomonas campestris,* by whole culture fermentation of a medium containing 2% to 5% commercial glucose, organic nitrogen source, dipotassium hydrogen phosphate and appropriate trace elements. The incubation time is approximately 96 hours at 28° C., aerobic conditions. In preparing the Xanthomonas colloid as aforesaid, it is convenient to use corn steep liquor or distillers' dry solubles as an organic nitrogen source. It is expedient to grow the culture in two intermediate stages prior to the final innoculation in order to encourage vigorous growth of the bacteria. These stages may be carried out in media having a pH of about 7. In a first stage, a transfer from an agar slant to a dilute glucose broth may be made and the bacteria cultured for 24 hours under vigorous agitation and aeration at a temperature of about 30° C. The culture so produced may then be used to innoculate a higher glucose (3%) content broth of larger volume in a second intermediate stage. In this stage, the reaction may be permitted to continue for 24 hours under the same conditions as the first stage. The culture so acclimated for use with glucose by the aforementioned first and second stages is then added to the final glucose medium. In the aforesaid method of preparing a *Xanthomonas campestris* hydrophilic colloid, a loopful of organism from the agar slant is adequate for the first stage comprising 200 milliliters of the said glucose media. In the second stage the material resulting from the first stage may be used together with nine times its volume of a 3% glucose media. In the final stage, the material produced in the second stage may be admixed with 19 times its volume of the final media. A good final media may contain 3% glucose, 0.5% distillers' dry solubles, 0.5% dipotassium phosphate, 0.1% magnesium sulphate having seven mols of water of crystallization and water. The reaction in the final stage may be satisfactorily carried out for 96 hours at 30° C. with vigorous agitation and aeration. The resulting *Xanthomonas campestris* colloidal material which I have found to be particularly suitable for my purpose can be recovered by precipitation in methanol of the clarified mixture from the fermentation. This resulting material may be further characterized as a hydrophilic colloid or gum produced by the bacterium species *Xanthomonas campestris.*

Alternative Xanthomonas colloidal material was prepared by repeating the above preparation procedure with certain other known Xanthomonas bacteria, namely with: *Xanthomonas incanae, Xanthomonas carotae, Xanthomonas begoniae, Xanthomonas phaseoli* and *Xanthomonas malvacerarum.*

However, these alternative Xanthomonas hydrophilic colloid materials are not full equivalents, i.e., they must be substituted in different proportions from that of the *Xanthomonas campestris.* Accordingly, equivalent Xanthomonas colloids found satisfactory for substitution for the campestris variety in the examples to be described hereinafter are listed below in Table I. Listed also are the relative proportions generally substituted for one part *Xanthomonas campestris.*

TABLE I

| Xanthomonas colloid equivalents were derived from: | Substituent colloid quantity, parts |
|---|---|
| *Xanthomonas campestris* | 1 |
| *Xanthomonas malvacerarum* | 1.25 |
| *Xanthomonas carotae* | 1.25 |
| *Xanthomonas begoniae,* strain 3 | 1.65 |
| *Xanthomonas begoniae,* strain 9 | 1.1 |
| *Xanthomonas incanae* | 1.5 |
| *Xanthomonas phaseoli* | 1.1 |

The following are further examples of finishing cements illustrating my invention:

*Example I*

| | Percent |
|---|---|
| $CaCO_3$—200 mesh | 67.2 |
| Casein—mm. 8 | 5 |
| Asbestos S floats | 12 |
| Mica—325 mesh | 10 |
| Clay—Georgia kaolin, 300 mesh | 5 |
| Sodium carbonate | 0.5 |
| Xanthan gum derived from *Xanthomonas campestris* | 0.3 |

Use 70 parts water to 100 parts of the dry cement for good working consistency. Blend thoroughly each hour during usage.

Alternative Xanthomonas hydrophilic colloids were also used in this cement formulation, namely colloids derived from *malvacearum, begoniae, carotae, incanae* and *phaseoli* strains of Xanthomonas, adjusting concentrations as indicated in Table I.

Each of these additives, according to the invention improved the workability of this cement and, in addition, were observed to reduce water-separation and give good cling.

*Example II*

| Mix: | Lbs. |
|---|---|
| $CaCO_3$, minus 200 mesh | 50.0 |
| Casein, minus 50 mesh | 4.0 |
| Soya protein, minus 50 mesh | 2.0 |
| Mica, minus 240 mesh | 10.0 |
| Talc, minus 240 mesh | 5.0 |
| Clay, minus 300 mesh, Georgia kaolin | 28.0 |
| Sodium carbonate | 0.5 |
| *Xanthomonas incanae* hydrophilic colloid | 0.45 |

To 100 parts of this dry mix I add 55 parts of water to obtain the proper consistency for use. The pH is adjusted with a small amount of sodium carbonate apt for this casein-soya protein adhesive system. Different additives will be apt for other cements or other ahesives.

*Example III*

| Mix: | Parts |
|---|---|
| $CaCO_3$ | 300 |
| Kaolin | 50 |
| Silica | 100 |
| Asbestos | 100 |
| Polyvinyl acetate homopolymer emulsion | 100 |
| Mica | 125 |
| Dipropylene glycol | 10 |
| Tetrapotassium pyrophosphate | 0.5 |
| Fungicide (e.g. PMA–30) | 1 |
| Water in which is dissolved 2 parts of xanthan gum derived from *Xanthomonas malvacearum* | 300 |

Mix the above together in the order shown, blending well.

Other cement formulations like those above may be made to incorporate the invention by merely substituting another Xanthomonas colloidal material as indicated in Table I, varying proportions accordingly.

The aqueous cements prepared according to the above formulations were found to exhibit the superior workability and cling characteristics of the invention when applied to a substrate. The cements were found to be relatively smooth and workable during application, but immediately thereafter "set up" to the extent that a good dripless cling was produced, thereby keeping the cement in place when applied and of the thickness laid on. In addition, the cements exhibited superior "trowelability" characteristics, whereby the applied glob of cement could be made to spread smoothly and evenly feathered out.

When applied to vertical surfaces, no sag or drip was found, whereas for a prior art cement of the same workability (lower viscosity) this would be expected.

The basic ingredients of aqueous finishing cements for use with the invention will comprise an aqueous medium as the continuous phase of a solution and mineral filler ingredients as the "dispersed phase" thereof, together with various addition agents, such as the inventive application-promoters, binding agents, etc.

A wide variety of mineral fillers may be used, including limestone, silica, clay, pyrophyllite, slate, asbestine, mica, barite, and the like. Some of these will have greater water absorption than others. For example, asbestine will generally require a higher percentage of water than ground silica.

The cement binder or adhesive, may be vegetable derived glues, such as soya protein, zein, starches and modified starches and the like; or milk derived glues such as casein. Completely synthetic materials may also be used, such as sodium polyacrylate, and the like.

In the foregoing, we have described various cement compositions apt for use with the invention. While these cements have proven especially apt for use with the application-promoters prescribed by the invention, other cements and finishing materials such as ceramic compounds, tile cements, texturing or stippling compositions and the like, will likewise employ the inventive addition agents with similar advantageous results. Cements incorporating a Xanthomonas colloid in accordance with my invention include virtually all such compositions wherein it is desired to improve applicability, workability, cling properties and spreading properties without any deterioration in suspending properties, in viscosity or the like.

It will be understood that while there have been described herein certain specific embodiments of this invention, it is not intended that the invention be limited to or circumscribed by the specific details given in view of the fact that this invention is susceptible of various modifications and of changes in materials and in proportions, in preparation and application, these changes being apparent to those skilled in the art, as falling within the spirit and scope of this disclosure and of the claims appended hereto.

I claim:

1. A hydraulic finishing cement consisting essentially of:

from about 35% to about 70% cementitious mineral materials, said materials being selected from at least two from the group consisting of limestone, clay, silica, pyrophyllite, asbestine, mica, pumice and barite, a minor portion in the range of 1% to 8% of a cement binder, and containing a small quantity of a Xanthomonas hydrophilic colloid, said colloid being selected from the group consisting of *Xanthomonas campestris, Xanthomonas incanae, Xanthomonas begoniae, Xanthomonas carotae, Xanthomonas phaseoli,* and *Xanthomonas malvacearum* colloid, said quantity comprising less than about 5% and more than .1% by weight of said cement, and sufficient to give the cement improved application and workability properties.

2. A dripless water base cement mix consisting essentially of:

a major portion in the range of 50% to 95% of finely ground cementitious material, said material being selected from the group consisting of limestone, silica, clay, pyrophyllite, asbestine, mica, pumice, and barite, from about 1% to about 8% by weight of said mix of a cement binder and, from about 0.1% to about 5.0% by weight of said mix of a Xanthomonas hydrophilic colloid selected from the group consisting of *Xanthomonas campestris, Xanthomonas incanae, Xanthomonas begoniae, Xanthomonas carotae, Xanthomonas phaseoli,* and *Xanthomonas malvacearum* colloid, said quantity being sufficient to give the cement improved cling and workability.

3. A dripless water base cement mix consisting essentially of:

a major portion in the range of 50% to 95% of finely ground cementitious material selected from the group consisting of limestone, silica, clay, pyrophyllite, asbestine, mica, pumice, and barite, from about 1% to about 8% by weight of said mix of a cement binder, said binder being selected from the group consisting of casein, zein, soybean derivatives, starches, sodium polyacrylate and cellulose ether, and, a small quantity in the range of .1% to 1.5% of a Xanthomonas hydrophilic colloid selected from the group consisting of *Xanthomonas campestris, Xanthomonas incanae, Xanthomonas begoniae, Xanthomonas carotae, Xanthomonas phaseoli,* and *Xanthomonas malvacearum* colloid, said quantity being sufficient to give the resulting cement suspension improved cling and workability.

4. A dripless hydraulic cement mix comprising:

from about 10% to 70% of inert powdered cementitious material selected from the class consisting of limestone, silica, clay, pyrophyllite, asbestine, mica, pumice, and barite, from about 1% to about 8% of a cement binder, said binder being selected from the group consisting of casein, zein, starches, soybean derivatives, sodium polyacrylate and cellulose ether, and, less than about 5% by weight and more than .1% by weight of said mix of a Xanthomonas hydrophilic colloid selected from the group consisting of *Xanthomonas campestris, Xanthomonas incanae, Xanthomonas begoniae, Xanthomonas carotae, Xanthomonas phaseoli* and *Xanthomonas malvacearum* colloid, said quantity being sufficient to give the cement improved cling and workability.

5. A dripless aqueous cement suspension consisting essentially of:

from about 35% to about 70% by weight of said suspension of powdered cementitious material selected from the group consisting of limestone, silica, clay, pyrophyllite, asbestine, mica, pumice, and barite, from about 1% to about 8% of a cement binder, a small quantity of a Xanthomonas hydrophilic colloid selected from the group consisting of *Xanthomonas campestris, Xanthomonas incanae, Xanthomonas begoniae, Xanthomonas carotae, Xanthomonas phaseoli,* and *Xanthomonas malvacearum* colloid, said quantity being from about 0.1% to about 5.0% by weight of said suspension sufficient to give resultant cement suspension improved cling and workability, and, sufficient of an aqueous medium to render said suspension of a pasty, workable plasticity.

6. A dry hydraulic cement mix consisting essentially of:

from about 50% to about 95% powdered cementitious material by weight of said mix, said material selected from the group consisting of limestone, silica, clay, pyrophyllite, asbestine, mica, pumice, and barite, and said material being ground to below 200 mesh fineness, from about 1% to about 8% by weight of said mix of a cement binder and a quantity of a Xanthomonas hydrophilic colloid selected from the group consisting of *Xanthomonas campestris, Xanthomonas incanae, Xanthomonas begoniae, Xanthomonas carotae, Xanthomonas phaseoli,* and *Xanthomonas malvacearum* colloid, said quantity being less than about 5% by weight and more than .1% by weight of said mix, and sufficient to produce a resultant cement suspension having improved cling and workability.

7. A dry water-base cement mix consisting essentially of:

from about 50% to about 95% of powdered cementitious material by weight of said mix, said material including a major portion of lime and cementitious reactants selected from the group consisting of limestone, silica, clay, pyrophyllite, asbestine, mica, pumice, and barite, from about 1% to about 8% by weight of said mix of a cement binder, said binder selected from the class consisting of casein, soybean derivatives, zein, starches, cellulose compounds, and sodium polyacrylate and from about 0.3% to about 1.5% by weight of said mix of a Xanthomonas hydrophilic colloid selected from the group consisting of *Xanthomonas campestris, Xanthomonas incanae, Xanthomonas begoniae, Xanthomonas carotae, Xanthomonas phaseoli,* and *Xanthomonas malvacearum* colloid, said quantity being sufficient to give resultant cement suspension improved cling and workability.

8. A hydraulic cement mix which is compatible with substantially all concentrations of additive ingredients consisting essentially of:

from about 50% to about 95% of cementitious materials by weight of said mix, said materials selected from the group consisting of calcium silicates and calcium aluminates, from about 1% to about 8% by weight of said mix of a cement binder, said binder selected from the class consisting of casein, soybean derivatives, zein, starches, cellulose ether, and sodium polyacrylate and from about 0.1% to about 5.0% by weight of said mix of a Xanthomonas hydrophilic colloid selected from the group consisting of *Xanthomonas campestris, Xanthomonas incanae, Xanthomonas begoniae, Xanthomonas carotae, Xanthomonas phaseoli,* and *Xanthomonas malvacearum* colloid, said quantity being sufficient to give resultant cement suspension improved cling and workability, said Xanthomonas colloid further being wholly compatible with all of said additive ingredients.

9. A wall joint cement suspension consisting essentially of from about 25% to about 48% of finely ground cementitious materials by weight of said suspension, said materials being selected from at least two from the group consisting of limestone, silica, clay, pyrophyllite, slate, asbestine, mica, barite, and mixtures thereof, said material being ground to below 200 mesh fineness, a small amount of *Xanthomonas campestris hydrophilic* colloid in the proportion of from about 0.1% to about 5.0% by weight of said suspension, from about 1% to about 8% by weight of said suspension of a cement adhesive chosen from the class consisting of casein, zein, starches, cellulose, ether, sodium polyacrylate soybean derivatives and mixtures thereof, and water sufficient to yield a pasty, workable plasticity to said suspension.

10. A hydraulic finishing cement consisting essentially of:

from about 35% to about 70% of an essentially inert mineral filler, from about 1% to about 8% by weight of cement binder, a quantity in the range of .1% to 5% of a Xanthomonas hydrophilic colloid, and sufficient water to render said cement of a putty consistency.

References Cited by the Examiner

UNITED STATES PATENTS

| | | | |
|---|---|---|---|
| 1,382,617 | 6/1921 | Blenio | 106—142 |
| 2,257,281 | 9/1941 | Scholz | 106—148 |
| 2,292,616 | 8/1942 | Dailey | 106—114 |
| 2,305,483 | 12/1942 | Letters | 106—91 |
| 2,456,269 | 12/1948 | Gill | 106—113 |
| 2,485,259 | 10/1949 | Chrisler | 106—114 |
| 2,662,024 | 12/1953 | Riddell et al. | 106—114 |
| 2,876,841 | 3/1959 | Ryan | 106—92 |
| 2,902,378 | 9/1959 | Toulmin | 106—92 |
| 2,950,206 | 9/1960 | Ostergren | 106—119 |

ALEXANDER H. BRODMERKEL, *Primary Examiner.*

D. J. ARNOLD, *Assistant Examiner.*